United States Patent [19]

Class et al.

[11] 4,251,309
[45] Feb. 17, 1981

[54] METHOD OF MAKING ROTOR BLADE ROOT END ATTACHMENT

[75] Inventors: Charles A. Class, Oreland, Pa.; Thomas S. Scarpati, Madison, Conn.

[73] Assignee: The United States of America as represented by the Secretary of the Army, Washington, D.C.

[21] Appl. No.: 948,718

[22] Filed: Oct. 5, 1978

[51] Int. Cl.³ ............................................ B29C 1/14
[52] U.S. Cl. .................................. 156/245; 156/173; 156/196; 156/212; 156/214; 156/227; 156/242; 416/226; 416/230
[58] Field of Search ............... 416/226, 230 A, 134 A, 416/226, 241 A, 229; 156/196, 212, 214, 227, 242, 245, 173

[56] References Cited

U.S. PATENT DOCUMENTS

| | | | |
|---|---|---|---|
| 3,021,246 | 2/1962 | Hütter et al. | 156/196 |
| 3,476,484 | 11/1969 | Brunsch | 416/230 A |
| 3,923,422 | 12/1975 | Ianniello et al. | 416/226 |
| 3,943,020 | 3/1976 | Ashton et al. | 416/226 |
| 3,950,115 | 4/1976 | Euler | 416/226 |
| 3,967,996 | 7/1976 | Kamov et al. | 156/156 |
| 4,096,012 | 6/1978 | Belko et al. | 156/214 |

Primary Examiner—Caleb Weston
Attorney, Agent, or Firm—Nathan Edelberg; Robert P. Gibson; Norman L. Wilson, Jr.

[57] ABSTRACT

A helicopter spar root end and blade assembly for attachment to the rotary head of the helicopter, the spar includes the root end attachment having a series of formed apertures therein generally molded from strips of fiber reinforced tapes, and which tapes are turned from their disposition at the apertures for extension outboard of the blade to enhance its structural reinforcement against fatigue and fracture. The method for forming such a spar root end and blade assembly includes the disposition of a removable form for positioning of the resin treated tapes along the intended length of the spar root and blade, simultaneously positioning fiberglass sheets into the configuration of the intended blade assembly, and then compressing die halves into position around the tape and sheet formed assembly at a pressure and temperature for a stipulated period of time until the molded assembly and its inherent resin achieves curing and setting into its final and concise form.

4 Claims, 10 Drawing Figures

U.S. Patent Feb. 17, 1981 Sheet 1 of 2 4,251,309
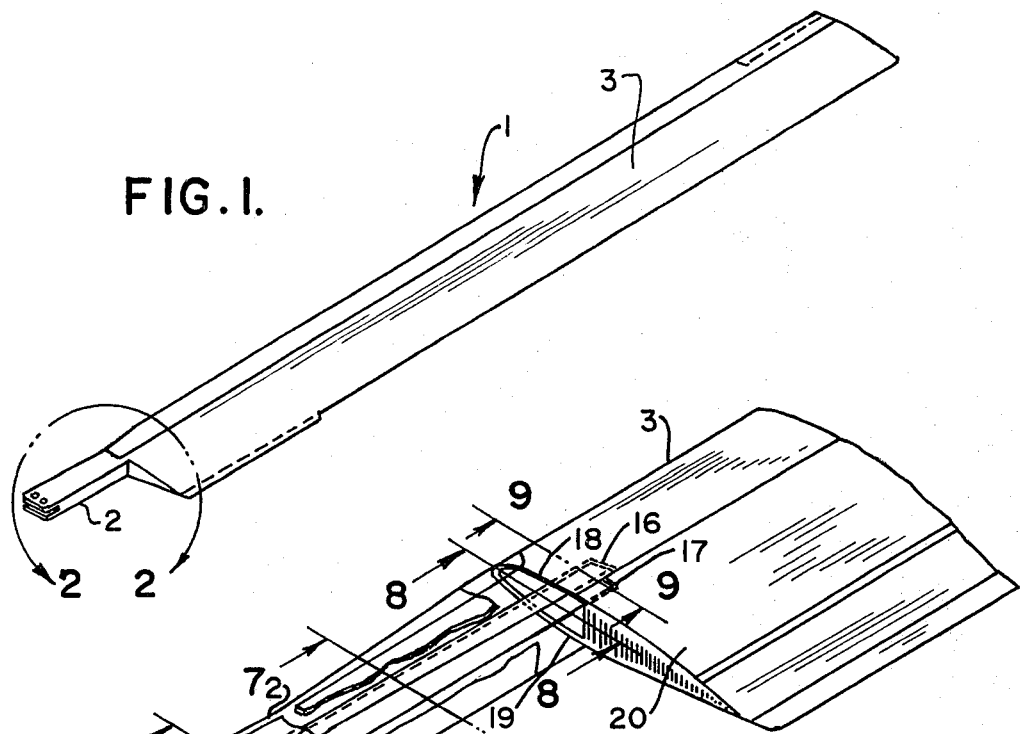
FIG. 1.
FIG. 2.
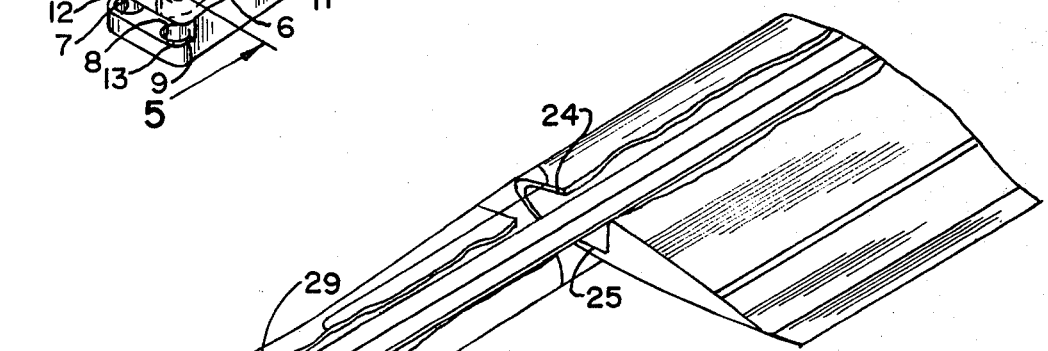
FIG. 3.
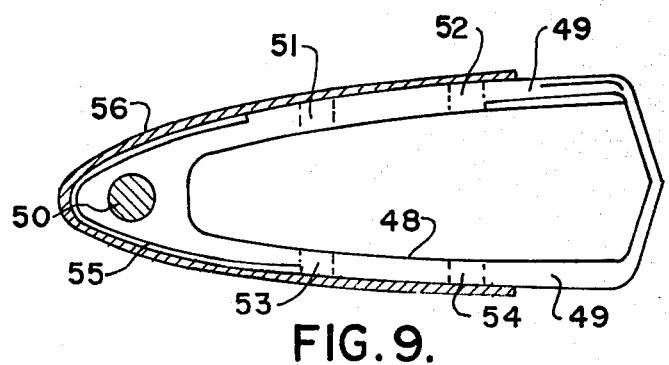
FIG. 9.

METHOD OF MAKING ROTOR BLADE ROOT END ATTACHMENT

BACKGROUND OF THE INVENTION

This invention relates generally to the formation of a composite helicopter blade, and more specifically pertains to the means and method for forming a structurally reinforced blade assembly incorporating reduced metallic or other weight enhancing structures within the composite form.

The helicopter has become very much in vogue over the past few decades as a very necessary instrument in the military arsenal. In addition, it has gained widespread acceptance in the field of transportation and surveillance. The early designs for this airborne craft more generally were used for transporting a variety of personnel and equipment, many of the contemporary uses for the aircraft include only the conveyance of one or two occupants for a short duration of time. For example, the helicopter may now be used for reconnaissance in the military field, or for carry only a pilot and an observer, as frequently used for traffic forecasting around the urban centers. As a result, it has become desirable to significantly reduce the weight of the craft. Included in such reduction has been the emphasis upon constructing the rotor blade from light weight materials other than metals. As an example, as seen in the U.S. Pat. to Brunsch, No. 3,713,753, the airfoil for the helicopter rotor blade is formed from a reinforced fiber that is laminated upon a mandrel into the shape of a helicopter blade. And, another patent to the same inventor, U.S. Pat. No. 3,476,484, discloses a rotor blade having fiber reinforced plastic strands that extend in a longitudinal direction along the blade so as to reinforced the blade, and to strengthen the same in the position of its root end.

Still another prior art patent, U.S. Pat. No. 3,754,840, to the inventor Zincone, discloses a composite helicopter rotor and blade which is built around a selectively fabricated structural spar. The invention includes a central filler member formed from a plurality of fibers, and teaches the method of developing strength through the capturing of metallic components within its laminae.

While these prior art disclosures are significant for showing various forms of helicopter blade assemblies, formed from lighter weight materials, and even having inherent substantially enhanced strength, the prior art further discloses the integration of metallic components within the blade assembly in order to attain the strength desired for their specific fabrications.

The primary object of the current invention is to provide a composite helicopter rotor blade that includes provision for attachment of the blade to the rotary head through a multiple, all composite, arrangement of inherent lugs, without incorporating captured metallic parts, such as shown in the prior art, such as increases the weight of earlier style blades, reduces their reliability, and due to their material make up are subjected to environmental and stress corrosions during service.

A further object of this invention is the conception of the fabrication of a helicopter blade, and its spar root end, through the use of preimpregnated tapes of fiber, such as fiberglass, or other plastic, adhered with an advanced epoxy or other resin and which is more suitable to automated lay up and production than can be attained from the dry fiber type assemblies as used in the prior art that subsequently apply an application of a wet epoxy resin after the form emplacement of its patterned fiber components.

Another object of this invention is the provision of particularly and patterned arranged reinforcing tapes into the configuration of a helicopter blade assembly so as to provide integral reinforcement between the proximate leading upper and lower edges of the formed blade with its securement to the rotary head at the helicopter attaching root assembly.

A further object of this invention is the provision of a form of arranged fiber reinforced components that are die compressed and cured into their precise final configuration of the desired blade assembly.

Yet another object of this invention is the disclosure of a tooling concept for forming a significantly reinforced helicopter blade.

Still a further objective of this invention is the provision of tooling and their sequential usage for furnishing degrees of pressurization and heat for effecting precise initial formation and subsequent setting of a completely nonmetallic formed helicopter blade assembly.

These and other objects will become more apparent to those skilled in the art upon reviewing the summary of this invention, and upon undertaking a study of its preferred embodiment in view of its drawings.

SUMMARY OF THE INVENTION

This invention contemplates a method of manufacturing a multiple, all composite spar root end attachment and blade assembly, including all of the necessary tools for achieving such, with such blades having utility as either the main or tail rotor blades for the helicopter. The invention envisions the method of providing material lay up through the utilization of impregnated continuous lengths of fiber reinforced plastic, generally in tape form. The tape furnishes the inherent structure desirable in the formation of the more contemporary style of fiberglass formed hollow blades, while simultaneously furnishing the means for enhancing the strength of the formed blade, particularly at the location of its root end attachment means where it connects with the rotary head of the helicopter.

In accordance with the present invention, preimpregnated tapes of proper precut to make up the spar pack, are transitioned or twisted approximately 90° from their vertical arrangement at the inboard position proximate the root end attachment area, where they form internally disposed apertures for the lug connecting means of the blade assembly, and the upper and lower walls of the spar pack when molded into their final configuration. Each of these combination spar packs, which form the vertical pin joints, is initially laid over a combination lay-up mandrel and expander assembly, which may be made of any suitable material including a shaped rubber or any other form of size reducible elastomeric material. The laid-up tapes are then combined with fiberglass sheets to provide the finely molded walls for the contoured airfoil portion of the blade assembly. When all is laid up the die means are brought under pressure and heat into contact with the form supporting the tapes and fiberglass sheets as stated. The cooperation between the elasticized mold and the forming dies provides a properly developed transitional surface to account for the combined adherence of the resin or epoxy prepregnated fiber reinforced tapes. The mandrel is capable of applying pressure to the curing laminae in such a way as to compress them outwardly against a female mold surface of closed dies. This combined molding tool is capable of expanding at a variable but programmable fashion to account for the variable thickness of the clustered tapes from their vertical disposition around the root end connecting apertures to their horizontal arrangement within the spar pack of the root and blade assemblies.

DETAILED DESCRIPTION OF THE INVENTION

In the preferred embodiment, the spar pack root assembly is made up of a multiple of such clustered preimpregnated tapes, still in the uncured stage. When these assemblies are arranged over a pressure medium capable of applying outward pressure against the laminae, and compressed against the female surface of closed dies, they are molded into an inherent disposition within the formed upper and lower walls at a forward location of the blade assembly, where structural reinforcement is desired for the blade when used in high stress operating conditions on a helicopter.

BRIEF DESCRIPTION OF THE DRAWINGS

In the drawings,

FIG. 1 provides an isometric view of the spar root end and blade assembly of this invention;

FIG. 2 furnishes a view of the spar root and partial blade assembly, disclosing in detail the root end attachment means of the invention;

FIG. 3 furnishes another partial view of the spar root and blade assembly disclosing one of the clustered spar packs vertically arranged around its root end connecting aperture and transitioned into a more horizontal configuration in helping to form the upper and lower walls of the said blade;

FIG. 9 furnishes a cross sectional view of a forward portion of the blade assembly airfoil taken along the line 9—9 of FIG. 2.

DESCRIPTION OF THE PREFERRED EMBODIMENT

Figure 4:
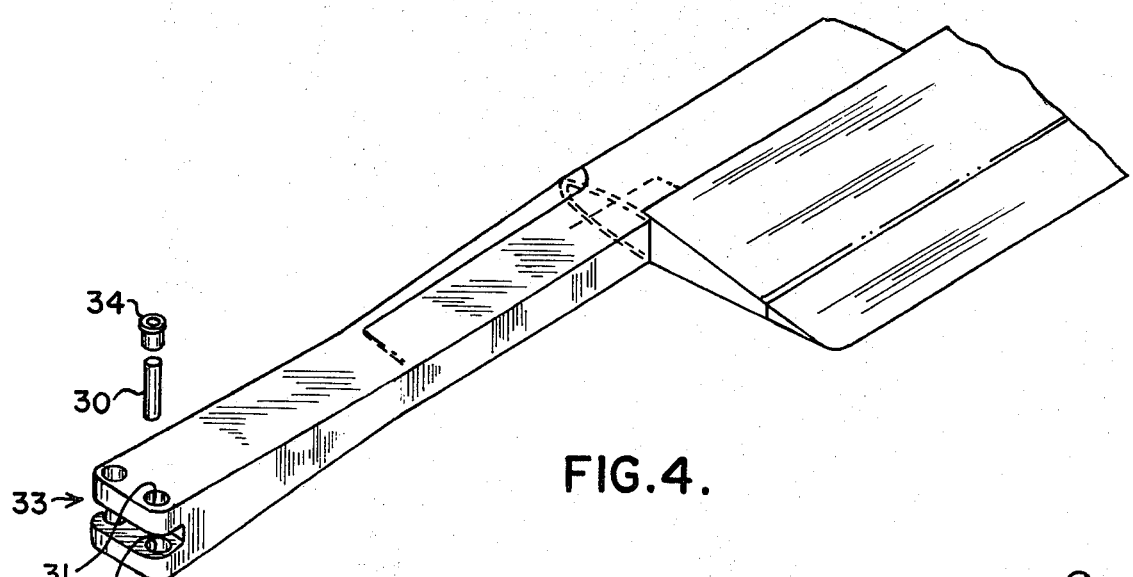
FIG. 4 discloses a similar view of the invention as FIG. 2, but further shows the use of a pressed sleeve for reinforcing the root end apertures.

In referring to FIG. 1 of the drawings, there is disclosed the helicopter blade 1 of this invention which integrally is formed having the spar root assembly 2 connecting with the blade assembly 3, and which blade assembly is molded into an airfoil configuration so as to provide the desired control and lift during the helicopter operations.

In referring to FIG. 2, the spar root assembly 2 includes the root end attachment means 4 which is formed to that configuration necessary to provide for its secure attachment to the rotary head (not shown) of the helicopter rotor. As can be seen, there are a series of apertures, as at 5 through 8, formed at this attachment means, and a transverse slot 9 may be provided horizontally across and partially through the end of the assembly 2, and which is compatible for connecting with the securing mechanisms normally associated with the rotary head, as aforesaid.

As can further be seen in FIG. 2, and what constitutes one of the features of this invention, is the provision of a clustered series of reinforced tapes, a pack of each clustered tapes being associated around each of the aforesaid formed apertures 5 through 8, and with these tapes being identified generally at 10 through 13, respectively. These clustered tapes, or each one associated with an aperture 5 through 8, integrally form these said apertures, with the tapes at these locations being generally vertically oriented, and in their extension outboardly of the blade assembly undertaking a twist, as shown at 14 and 15, into a horizontal disposition for their extension into and integrally of the blade assembly of the helicopter.

Two of these clustered tapes, as at 16 and 17, extend into the blade assembly as shown. These particular clusters of tapes are arranged around the formed aperture 6 of the root assembly, and then extend outboardly of the blade and are embedded during the blade molding process, within the formed upper wall 18, forming part of the hollow frontal portion of the spar root and blade assembly.

As is known in the art, the remaining portion of the blade assembly 3 of the helicopter fixture, such as the remaining portion of the upper and lower walls 18 and 19, and the rearwardly extending air foil portion 20, are formed from laminar plies of fiberglass sheets of material as secured together by means of various epoxies or other resins, and then molded under heat and pressure into their final configuration of that of the blade assembly, as shown. Thus, and as can be seen, the entire helicopter blade assembly 1, as shown in FIG. 1, can be entirely fabricated from nonmetallic components, reinforced through the generous use of a plurality of clustered resin impregnated tapes which, as previously explained, continuously extend around the formed apertures 5 through 8 of the root end attachment means, and then extend outwardly, after being conveniently turned, to form part of the upper and lower reinforcements within the shaped upper and lower walls of the spar root and blade assembly. Thus, the spar root, and where it is transitioned into the blade assembly, it fully structurally reinforced through the use of these nonmetallic type of components.

As can be seen in FIG. 2, the clustered tapes 10 and 11, in addition to comparable clusters of lower disposed tapes, as at 12 and 13, extend outboardwise of the spar root assembly, and extend at least for some distance, as shown, into the blade assembly. In another embodiment, as shown in FIG. 3, it can be seen that the clustered tape 21 is looped to form an aperture 22, with each leg of the clustered tapes then extending through the spar root assembly 23, and then integrally into the upper wall 24 of the blade assembly for further extension outboard of the assembly towards the region of its outer tip. Thus, in this particular embodiment, the clustered tapes surround or form each of the shown apertures, such as the apertures 22, 26, 27, and 28, there being actually four clusters in number, corresponding to each aperture. From the loops they extend outboardly of the spar root and blade assembly to provide the desired reinforcement within its upper and lower walls 24 and 25. As can also be seen with respect to the tapes 21, they are vertically disposed with respect to the formation of their inherent aperture 22, and then twisted, as at 29, for turning into a more horizontal disposition for becoming eventually embedded within these upper and lower walls 24 and 25, respectively of the aforementioned assemblies. It is also shown that the tapes are staggered in partial lapping fashion in their extension into the blade assembly, for further reinforcement.

The series of clustered tapes, shown in FIGS. 2 and 3, are designed for embedment within both the spar root and blade assemblies so as to provide a maximum degree of reinforcement therein without furnishing a redundancy of strength. For example, in the embodiment as shown in FIG. 3, the tapes are generally formed, and at least in that specific embodiment, being approximately two and one fourth inches wide, and having a thickness of approximately 0.0092 inches. The finished thickness of the clusters of tapes, as arranged around one of the apertures 6, or 22, are generally a half inch to one and a half inches in thickness. As these clustered tapes extend outwardly into the blade assembly, they are gradually reduced in number, so that, as for example, at the vicinity of the transition between the spar root into the blade assembly there may be only sixty percent of the tapes yet remaining at this location. Thus, the tapes are gradually terminated in their extension outboard of the assembly, so that at the tip end of the blade, as in the embodiment shown in FIG. 3, anywhere from only 10 to 30 percent of the tapes remain clustered at that location.

While as previously mentioned, the series of tapes forming each aperture are generally sufficient for providing a reinforced aperture capable of accommodating attachment means for securing the spar root and blade assembly to the helicopter rotary head, it may be of further advantage to include some form of a sleeve through these apertures particularly, if wear is caused by any vibration that could occur from the connection of the root and attachment means to the aforesaid rotary head. Thus, and as shown in FIG. 4, a sleeve 30, which may be constructed of fiberglass or other treated fibrous material, is arranged through a pair of aligned apertures 31 and 32 of the attachment area 33. Furthermore, end caps 34 and 35 may be compressed onto engagement upon the sleeve 30 so as to provide a smooth transitioned aperture that is disposed vertically through the entire heighth of the spar root means 33. Thus, and as can be seen, the load transfer from the rotating blade to the rotary head of the helicopter is made through a highly fatigue resistant and very crack resistant composite of materials, which generally will not include metallic components.

Figures 5, 6, 7:
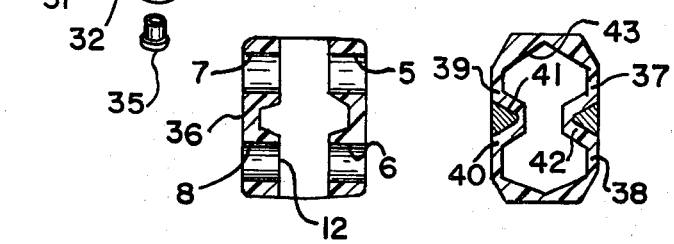
FIG. 5 provides a sectional view of the root end attachment means taken along the line 5—5 of FIG. 2.
FIG. 6 furnishes a sectional view of the spar root taken along the line 6—6 of FIG. 2.
FIG. 7 provides another sectional view of the spar root assembly taken along the line 7—7 of FIG. 2.

Various upright sectional views taken along the length of the spar root and blade assembly 1 of this invention are shown in FIGS. 5 through 8, and as can be seen, in FIG. 5, the root end attachment means 36 generally includes a rather rectangular shape, having the apertures 5 through 8 arranged at various locations to either side of the slot 12. Actually, it is not essential that this slot 12 be formed through the root end attachment means, but such is desirable for accommodating the particular style of attachment of the usual helicopter blade assembly to its standard rotary head. As can be seen in FIG. 6, the spar root assembly generally includes the upper and lower walls 37 through 40 having inwardly extending portions 41 and 42 therebetween as formed during the molding of the assembly, and which aids in the structural reinforcement of the root assembly as required. Furthermore, as previously explained, since there are four clusters of tapes disposed around the four apertures formed at the root end attachment means, these clusters of tapes are turned shortly after forming their respective apertures and then become embedded within these upper and lower walls 37 through 40, as previously described. But, of more significance, it can be noted that the interior, as at 43, as well as the interior of the entire spar root assembly and blade assembly, are hollow, thereby significantly reducing the weight of the entire assembly, but yet is inherently sufficiently structurally reinforced through its molded contours, and particularly having the clustered resin cured tapes arranged therethrough, so as to withstand the heavy impacting forces exerted upon such a blade during its usage.

Figure 8:
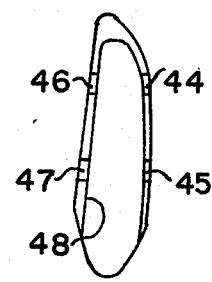
FIG. 8 discloses a sectional view of the transitional connectional between the spar root and blade assembly, taken along the line 8—8 of FIG. 2.

As can be seen in FIG. 7, the depth of the grooves 41 and 42 are gradually lessened, and are molded gradually outwardly into alignment with the upper and lower walls of the spar root so that as they attain the location of the formed airfoil for the blade assembly, these reinforcing grooves 41 and 42 no longer remain, but rather, are transitioned into the formation of the airfoil of the blade assembly, the frontal portion of which is shown in cross sectional in FIG. 8. But, the clustered reinforcing tapes 44 through 47 still remain embedded within the spar assembly at this location, are integrally molded within the fiberglass upper and lower walls of the blade assembly, and provides sufficient reinforcement for the same even through the blade assembly is formed having a significant internal cavity, as can be seen at 48, throughout its extent. Various other components are usually incorporated into the frontal portion of the spar means or blade assembly of a helicopter blade, either during or after its assembly, and as can be seen in FIG. 9, which discloses the spar portion of the blade assembly, the series of fiberglass wraps, as at 49, form the blade assembly around the significantly sized cavity 48 arranged internally thereof. In the molding of the assembly, a balance weight 50 may be provided at its frontal portion, and as can be seen, the clustered tapes 51 through 54 are integrally molded and embedded within the fiberglass skin of the blade assembly. In addition, a de-ice blanket 55, formed of some insulating material, is formed molded around the leading edge of the blade assembly, and a metallic shield, as at 56, and which may be formed from titanium, or any related material, may be provided around the leading edge of the blade assembly so as to protect it in the event that it encounters any obstructing object.

Figure 10:
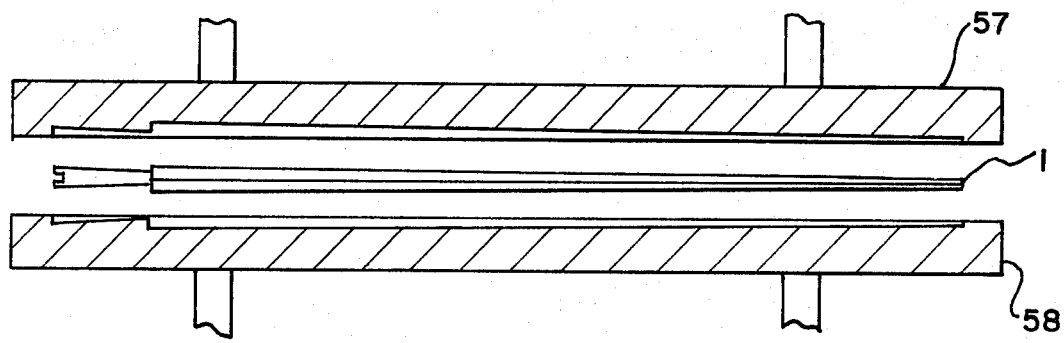
FIG. 10 provides a schematic view of the spar root and blade assembly after lay up and just prior to its compression within the shown die means.

The method of forming the spar root and blade assembly of this invention involves using a mold such as that of FIG. 10, and an expandable mandrel. The preimpregnated tapes of fiber, pretreated with an epoxy or other resin, will have been draped around a type of inflatable mold, as previously mentioned, with the fiberglass sheets being applied around this spar assembly, and the blade assembly, into the general shape of the desired airfoil. The lay-up is then pressure compressed, and exposed to heat, between a pair of female die halves 57 and 58. When in position, the dies are brought into contact against the set up blade assembly, and a minor amount of pressure, in the vicinity of 2 to 5 psi, so is applied as to provide for an initial and more refined shaping of the assembly into its desired configuration. After this occurs, the next step in the process for forming the final product is to compress the dies together to exert a pressure in the vicinity of 80 to 100 psi, and to expose the molding blade to a temperature in the range of 230° F. to 270° F., for a period of around 2 hours, to achieve a curing of the epoxy resin within their various tapes and fiberglass sheets forming the skin of the assembly. The temperature and pressure are then removed at a controlled rate to expose the final product. It may be commented that any type of the available resins other than expoxies can be used in the formation of the blade assembly. When preimpregnating the various tapes or fiberglass skin sheets, such resins as can be generally acquired from a company such as the 3M Company, of Minneapolis, Minnesota, as sold under the tradename of SP250-SF1 can be used. Furthermore, the fiberglass used in the formation of the blade skin can be acquired from a supplier such as Owens-Corning. In addition, the mold functioning as the mandrel about which the various impregnated tapes, or clusters of tapes, and the fiberglass skins are applied in furnishing the initial shaping to the assembly prior to its curing by means of the dies 57 and 58, may be fabricated of a rubber or other vulcanized material. The mandrel can contain a foamed polyurethane or polystyrene compound, which disintegrates when exposed to heat and pressure. The foamed polystyrene filled mold retains its integrity for a sufficient length of time so as to form the internal cavity throughout the length of the spar root and blade assembly, and finally, after the mold internal filling disintegrates, the entire mold bag or package can then be pulled free from within the interior of the assembly.

Variations in the construction, the assembly, and the method of fabricating the spar root and blade assembly of this invention may occur to those skilled in the art upon reviewing the subject matter of this disclosure. Such variations, if within the spirit and scope of this invention, are intended to be encompassed by any claims to patent protection issuing upon this invention. The description of the preferred embodiment set forth herein is provided for illustrative purposes only.

Having thus described the invention what is claimed and desired to be secured by Letters Patent is:

1. A method of fabricating a composite helicopter rotor blade comprising inflating an expandable and collapsible elastomeric mandrel, on the inflated mandrel laying up a series of tapes and sheets fabricated of glass fibers preimpreganted with a heat curable resin, looping said tapes to form root end attaching means at one end of the mandrel and then twisting the tapes so that they lay flat on the mandrel away from the root end, laminating the tapes with sheets away from the root end, disposing the resulting laminate to form upper and lower walls and structural reinforcements at stress points, arranging the laminates thus disposed in the contour of a rotor blade, compressing the sheets and tapes thus arranged against the inflated mandrel with external die means forming the final contour of a rotor blade, heating the die means to cure the resin to form the blade, collapsing the mandrel, and withdrawing said mandrel to form an internal cavity within the blade.

2. The invention of claim 1 wherein the die means compress the laminate at a pressure between about 65 to 80 psi, at a temperature of between about 180° F. to 230° F., and for a period of time of at least one hour.

3. The invention of claim 2 wherein the die means prepressurize the laminate tapes and sheets at an initial pressure of between about 2 to 5 psi.

4. The invention of claim 2 wherein the die means compress the laminate for a period of approximately two hours, and thereafter decrease the applied pressure and temperature at a controlled gradual rate.

* * * * *